Figure 3:
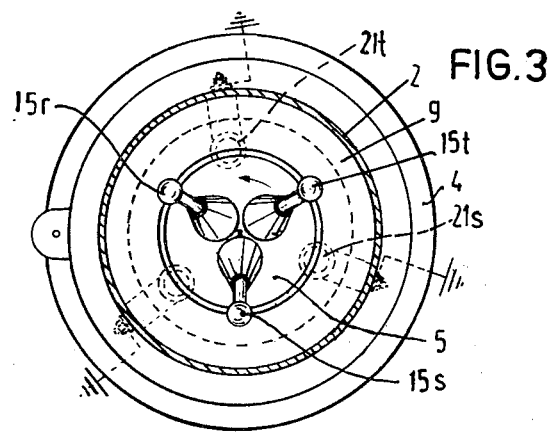

United States Patent [19]

Irik et al.

[11] 4,184,058
[45] Jan. 15, 1980

[54] POLYPHASE ISOLATOR SWITCHES

[75] Inventors: Gijsbert W. Irik, Bilthoven; Pieter Marien, de Meeren; Marius F. Fierst van Wijnandsbergen, Breukelen, all of Netherlands

[73] Assignee: Coq B.V., Utrecht, Netherlands

[21] Appl. No.: 814,934

[22] Filed: Jul. 12, 1977

[30] Foreign Application Priority Data

Jul. 23, 1976 [NL] Netherlands .................. 7608236

[51] Int. Cl.² ............................................. H01H 3/00
[52] U.S. Cl. ........................... 200/153 P; 200/155 R; 200/165; 200/238
[58] Field of Search ............... 200/238, 153 N, 153 S, 200/155 R, 165, 63 R, 153 P, 153 S

[56] References Cited

U.S. PATENT DOCUMENTS

| 2,070,337 | 2/1937 | Lowell | 200/155 R |
| 3,247,344 | 4/1966 | Russell | 200/238 X |
| 3,372,254 | 3/1968 | Burch et al. | 200/63 R |

FOREIGN PATENT DOCUMENTS

| 331964 | 9/1958 | Switzerland | 200/155 R |
| 3549 | of 1911 | United Kingdom | 200/155 R |
| 443175 | 2/1936 | United Kingdom | 200/63 R |

Primary Examiner—Joseph Man-Fu Moy
Attorney, Agent, or Firm—John P. Snyder

[57] ABSTRACT

A polyphase, e.g. three phase, isolator switch, of which the movable contact members of all phases extend through a common bushing insulator mounted in a partition between two compartments for rotation about an axis normal to said partition and are simultaneously moved to make and break the circuit by rotation of said insulator.

7 Claims, 8 Drawing Figures

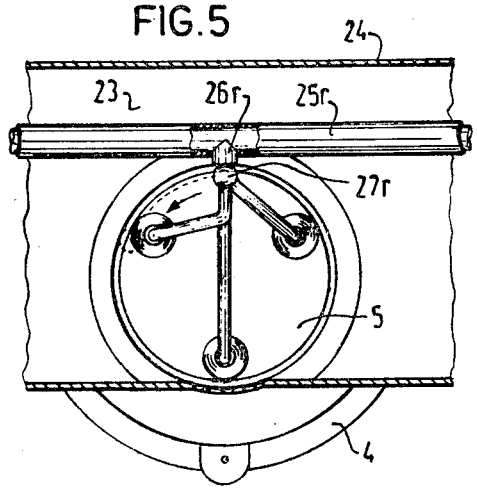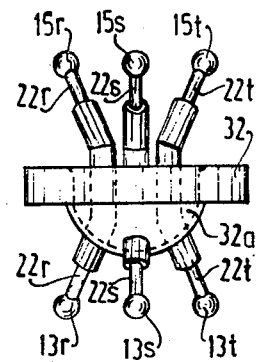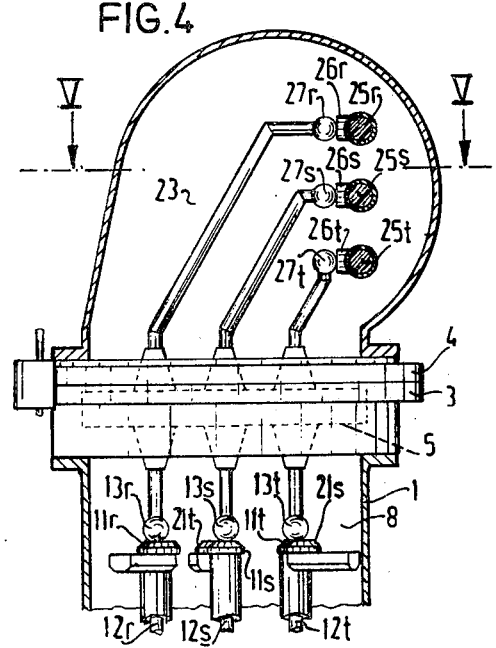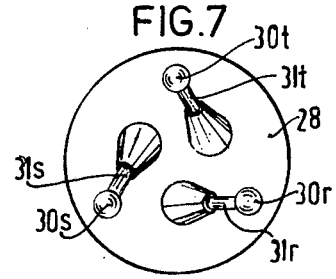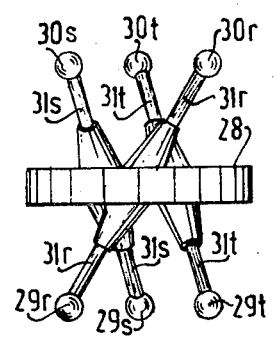

POLYPHASE ISOLATOR SWITCHES

The invention relates to a polyphase isolator switch for high voltages comprising a casing, a partition separating in said casing two compartments from one another, per phase of the switch two contact members which stay in place and of which one is mounted in one of said compartments and the other one is mounted in the other compartment of the casing, per phase a movable contact member adapted to co-operate with the contact members which stay in place and a bushing insulator which forms part of said partition and is mounted for rotation about an axis normal to the partition, said movable contact member extending through and being attached to the bushing insulator, at least one of those two contact members which stay in place being a fixed contact member which is eccentrically positioned in respect of the axis of rotation of the insulator and said movable contact member being adapted to be moved from a position, in which it electrically conductively interconnects the said two contact members which stay in place, into a position, in which the electrically conductive connection between the latter contact members is interrupted and vice versa by the rotation of the insulator only.

A switch of this kind is disclosed in the British Patent Specification No. 389,657. The known polyphase isolator switch consists of a number of individual monophase switches, of each of which the movable contact member extends through its own rotatable bushing insulator. This construction requires relatively much room, so that it is not suitable for metal clad switch gear and it makes the use of a mechanical coupling driving gear between the monophase switches necessary for their synchronous drive. Furthermore, each bushing insulator, must ensure a good seal between the separated compartments. The relatively great number of insulators increases the risk of leakage. The polyphase isolator switch composed of a number of individual monophase switches is voluminous, complicated and expensive.

The invention has the object to provide a polyphase isolator switch which does not possess the mentioned disadvantages of the known switch. This object is accomplished, in that the movable contact members of all phases of the switch extend through a common rotatable bushing insulator and are attached to said insulator and in both compartments the contact members which stay in place are fixed contact members which are eccentrically positioned in respect of the axis of rotation of the common bushing insulator. A polyphase isolator switch so constructed can be made very compact, so that it is very appropriate for mounting in a closed casing, consequently, for use in metal clad switch gear. It has only one single rotatable bushing insulator, whereby not only the cost of the switch but also the risk of leakage is considerably decreased. Moreover, the single bushing insulator forms an inexpensive, reliable, mechanical coupling member consisting of one piece only which couples the movable contact members of all phases of the switch with one another, so that the synchronism of movement of said movable contact members is guaranteed under all circumstances. Finally, double interruption in each phase is attained automatically.

It is observed that in the polyphase isolator switch constructed in accordance with the cited British Patent Specification No. 389,657 the end of the movable member of each monophase isolator switch, which end is contained in the casing of the circuit-breaker, is a rotatable rod extending in the axis of rotation of the bushing insulator. This rod-shaped end must not only be considered as the isolator's contact member which stays in place and is permanently connected with said movable contact member, but also forms one of the circuit-breaker's contact members which stay in place.

Furthermore, monophase isolator switches, of each of which the two contact members which stay in place are fixed contact members which are eccentrically positioned in respect of the axis of rotation of the bushing insulator, so that the switches have double interruption, are known from the German specification No. 289,501 and the Swiss specification No. 395,232. However, from these specifications it does not appear that the polyphase isolator switch according to the invention which has for all phases together one single rotatable bushing insulator only has considerable advantages over a polyphase isolator switch which in known manner is composed of a number of monophase isolator switches.

Since in the bushing insulator considerably smaller insulating distances between conductors of different phases are allowed than outside the insulator, a construction is recommended, in which of the movable contact members belonging to different phases the portions extending in the common bushing insulator lie at smaller distances from one another than the fixed contact members and the portions of the movable contact members which extend outside said insulator. This construction has the advantage that in the region, in which the contact members co-operate, great insulating distances and a great switching stroke can be used but the diameter of the bushing insulator can be made relatively small which makes the insulator stronger, easier to mount and cheaper and guarantees a better gas tightness.

For the direct connection of the polyphase isolator switch to other parts of the switch gear, say to a transversely directed busbar-system, it is possible to position, in at least one of the two compartments which are separated from one another by the partition provided with the common rotatable bushing insulator, the fixed contact members of all phases in offset relation to one another in the direction of the axis of rotation of said insulator. The fixed contact members of the isolator switch can then be attached to the conductors of the busbar-system without additional connecting conductors. In that case the fixed contact members and the parts of the movable contact members co-operating therewith of all phases may lie on straight lines which coincide in the closed condition of the switch. Those straight lines may be parallel to the axis of rotation of the bushing insulator. However, this is not a necessity.

Advantageously the common rotatable bushing insulator may be so formed as to have at least a part substantially formed as a hollow spherical cap which is concentric to the axis of rotation of the insulator and supports the movable contact members. Then the insulator can be made light but yet strong enough to take up the pressure differences between the compartments separated from one another by the partition with the insulator.

Figure 2:
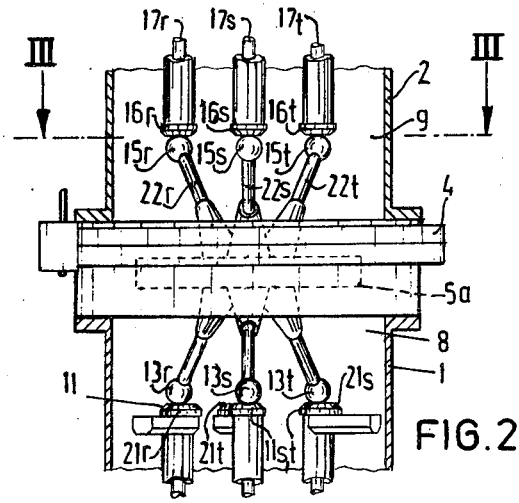
Figure 1:
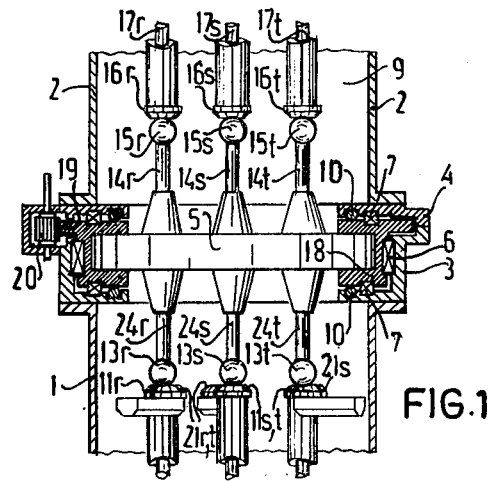

The invention will be further elucidated with the aid of the drawing. Therein is:

FIG. 1 partly an axial sectional view, partly an elevational view of a three phase isolator switch with double interruption according to the invention, FIG. 2 a variant of the isolator switch shown in FIG. 1, FIG. 3 a cross sectional view taken on line III—III of FIG. 2, FIG. 4 partly an axial sectional view, partly an elevational view of a three phase busbar isolator switch with double interruption, FIG. 5 a cross sectional view taken on line V—V of FIG. 4, FIG. 6 a side view of a variant of the bushing insulator of a three phase isolator switch with double interruption, FIG. 7 a front view of the bushing insulator with movable contact members shown in FIG. 6 and FIG. 8 a side view of still another bushing insulator with contact members for a three phase isolator switch with double interruption.

The three phase isolator switch shown in FIG. 1 is provided with a casing formed of two tubular parts 1 and 2 which are separated from one another by a composite disc 3, 4 in which one single disc-shaped bushing insulator 5 is mounted for rotation. To support this insulator a roller bearing 6 and two ball bearings 7 are provided. To separate the two compartments 8,9 in a gas tight manner O-rings 10 are provided. It is observed, that means may be used which make that in the closed condition of the switch the compartments 8,9 communicate through a leakage opening to equalize the gas pressures on both sides of the bushing insulator. However, in that case that leakage opening must be closed, when the switch is in its open condition, so that one of the compartments 8,9 can be opened without the danger of destroying the over-pressure in the other compartment.

The compartment 8 contains three fixed contact members $11_r$, $11_s$, $11_t$ which are eccentrically positioned in respect of the axis of rotation of the bushing insulator 5 and to which connecting conductors $12_r$, $12_s$, $12_t$ are attached. Co-operating with these fixed contact members $11_r$, $11_s$, $11_t$ are three movable contact members which are also eccentrically positioned in respect of said axis and consist of portions $13_r$, $13_s$, $13_t$; $14_r$, $14_s$, $14_t$; $15_r$, $15_s$, $15_t$. The movable contact members are supported by the common bushing insulator 5 and are fixed to the latter.

In the compartment 9 the movable contact members co-operate with the eccentrically positioned fixed contact members $16_r$, $16_s$, $16_t$ which are fixed to connecting conductors $17_r$, $17_s$, $17_t$, so that in each phase the switch makes and breaks the circuit in two places connected in series.

The common bushing insulator 5 is mounted in a ring 18 provided with a circular row of teeth 19 which mesh with a driving pinion 20. If the insulator 5 is rotated by means of the pinion 20, the movable contact member 13 is moved through an arc of a circle about the axis of rotation of the insulator. At a certain distance, e.g. an angular distance of 60°, from the fixed contact members $11_r$, $11_s$, $11_t$ additional fixed contact members $21_r$, $21_s$, $21_t$ are provided in the compartment 8, said additional contact members being connected with earth. These contact members make it possible to connect the movable contact members $13_r$, $13_s$, $13_t$ with earth, when the switch is in its open condition.

FIGS. 2 and 3 illustrate a variant of the three phase isolating switch for double interruption shown in FIG. 1. The movable contact members of the two switches are supported by the common bushing insulator 5, 5a and simultaneously moved in circular arcs about the axis of rotation of the insulator, when the latter is rotated. The driving of the movable contact members of the three phase switches is very simple, as separate means for the mechanical coupling to one another can be dispensed with. Furthermore, the rotation of the movable contact members requires little additional space, so that for metal clad switches the casing can be made relatively small.

The movable contact members $13,14,15_{(r,s,t)}$ of the switch shown in FIG. 1 extend parallel to the axis of the common insulator 5. The movable contact members $13,22,15_{(r,s,t)}$ of the switch illustrated in FIGS. 2 and 3 are so bent that their radial distance from the axis of rotation in places, where they extend in the common bushing insulator, is considerably smaller than the radial distances of their portions 13 and $15_{(r,s,t)}$ which co-operate with the fixed contact members. This has the advantage that the bushing insulator 5a may have a smaller diameter, so that it can stand a higher onesided gas pressure or may be constructed for the same load thinner and cheaper, whereas it can be easierly mounted in a gas tight way in the partition provided between the compartments 8 and 9.

The fixed contact members $21_r$, $21_s$, $21_t$ connected with earth are contained in the compartment 8. Their places on the circle of moving are illustrated in FIG. 3.

The three phase isolator switch with double interruption shown in FIGS. 4 and 5 has in the compartment 8 the same equipment as the switch shown in FIG. 1. Therein the fixed contact members $11_r$, $11_s$, $11_t$ lie in a common plane at right angles to the axis of rotation of the bushing insulator and the movable contact members move along arcs of a common circle which is concentric to said axis. The second compartment forms at the same time a part of a tube 24 for busbars, in which a three phase busbar-system $25_r$, $25_s$, $25_t$ is contained. In the compartment 23 the fixed contact members lie in offset relation to one another in the direction of the axis of rotation of the bushing insulator 5 on a straight line and they are directly attached to the respective busbars $25_r$, $25_s$, $25_t$. Also the portions $27_r$, $27_s$, $27_t$ of movable contact members co-operating with the fixed contact members lie on a line which is parallel to the axis of rotation, so that they move in equal arcs of separate circles about said axis.

It is observed that the busbars may also be mounted in the busbar tube 24 in a different way. The co-operating portions 26 and $27_{(r,s,t)}$ will then lie and move in other places and other paths, respectively.

The busing insulator 28 and the movable contact members $29_r$, $29_s$, $29_t$ and $30_r$, $30_s$, $30_t$ shown in FIGS. 6 and 7 may be mounted in the isolator switch illustrated in FIGS. 2 and 3. However, in FIGS. 6 and 7 the straight movable contact members 29, 30, $31_{(r,s,t)}$ extend in straight lines, which cross each other and the axis of the insulator 28 at acute angles. Also in that case the places, where the movable contact members extend in the common insulator, lie at smaller radial distances from the axis of rotation than the portions of the movable contact members outside the insulator and the fixed contact members co-operating with the movable contact members. It must, however, be kept in mind that in this construction equal phases are relatively spatially angularly shifted about the axis of rotation of the bushing insulator in the two compartments of the casing of the switch.

FIG. 8 illustrates a bushing insulator 32 with movable contact members 13, 22, 15$_{(r,s,t)}$ which can be used without any alteration in the three phase isolator switch with double interruption shown in FIGS. 2 and 3. Therein there is no spatial shift of the phases as in the construction shown in FIGS. 6 and 7. The only difference with the isolator switches described hereabove is that the insulator 32 is provided with a part 32a which has the shape of a hollow spherical cap and is concentric to the axis of rotation of the insulator. This shape makes the insulator still stronger. The wall of the cap-shaped part 32a may be relatively thin. Furthermore, the creepage distances on the surface of the insulator between earth and live parts are increased by the spherical shape.

What we claim is:

1. High voltage polyphase switchgear comprising, in combination:

metallic envelope means for containing dielectric gas under pressure;

partition means for separating said envelope means into adjacent compartments which are separated in gas tight fashion from each other;

a set of electrical conductors in one compartment and a set of electrical conductors in the other compartment, the conductors of each set being spaced from each other and from the envelope means whereby to conduct polyphase current, a first array of spaced contacts within said one compartment connected respectively to the conductors of that set within said one compartment and a second array of spaced contacts in said one compartment, pairs of contacts of the first and second arrays being coplanar and similarly spaced, and the contacts of said second array being connected to said envelope means, a third array of spaced contacts within said other compartment connected respectively to the conductors of that set within said other compartment;

said partition means comprising an insulator rotatably mounted about a fixed axis;

a plurality of connecting conductors projecting through said insulator in radially outwardly spaced relation to said axis and in symmetrical distribution thereabout, each connecting conductor including contacts at its opposite ends which bridge between the contacts of said first and third arrays in a first position of said insulator and engage only said second array of contacts in a second position of said insulator; and means for rotating said insulator between said first and second positions.

2. High voltage polyphase switchgear as defined in claim 1 wherein said contacts of said first and second arrays are coplanar and symmetrically spaced within the common plane thereof, and said contacts of the third array are also coplanar.

3. High voltage polyphase switchgear as defined in claim 2 wherein the planes of said arrays are perpendicular to said axis.

4. High voltage polyphase switchgear as defined in claim 3 wherein said connecting conductors diverge from each other on both sides of said insulator.

5. High voltage polyphase switchgear as defined in claim 1 wherein said insulator is of circular plan view and said partition means includes sealing means engaging opposite side marginal edge faces of said insulator.

6. High voltage polyphase switch gear as defined in claim 1, in which the contacts of said third array and the corresponding contacts of said connecting conductors lie on straight lines which coinside in said first portion of said insulator.

7. High voltage polyphase switch gear as defined in claim 6, in which said straight lines are parallel to the axis of rotation of said insulator.

* * * * *